United States Patent [19]

Fretwell

[11] 3,821,653

[45] June 28, 1974

[54] COMPUTER CLOCK FOR MEMORY MODULE

[75] Inventor: Charles C. Fretwell, Worthington, Ohio

[73] Assignee: MI2, Incorporated, Columbus, Ohio

[22] Filed: July 16, 1973

[21] Appl. No.: 379,800

[52] U.S. Cl. .................... 328/62, 307/208, 307/260, 307/262, 307/269, 328/63

[51] Int. Cl. .......................... H03k 1/00, H03k 3/04

[58] Field of Search ........... 307/208, 232, 262, 260, 307/265, 269; 328/48, 58, 59, 62, 63, 109

[56] References Cited

UNITED STATES PATENTS

| | | | |
|---|---|---|---|
| 3,048,785 | 8/1962 | Cartier | 328/62 |
| 3,628,065 | 12/1971 | Hill | 328/63 |
| 3,753,126 | 8/1973 | Hines et al. | 328/62 |

*Primary Examiner*—Stanley D. Miller, Jr.

[57] ABSTRACT

A computer clock for generating a pair of separate, related computer clock signals. The clock utilizes a precision crystal oscillator, binary counter and logic circuitry for generating the desired clock signals and features a reduction in the number of required logic gates below the conventional requirements.

7 Claims, 2 Drawing Figures

COMPUTER CLOCK FOR MEMORY MODULE

BACKGROUND

This invention relates generally to computer data processing equipment and more particularly relates to a clock for controlling the computer operations.

Nearly all computers require a clock for stepping the computer through its operations. Some of these computers require two separate and distinct clock signals which are precisely related. For example, a microcomputer such as the one disclosed by Intel Corporation in its specification booklet of June 1972 utilizes an integrated circuit, central processor unit mounted in a single package.

This central processor unit requires a pair of clock pulses having the period, pulse widths and pulse spacing within the tolerances indicated in FIG. 2 at $\phi_1$ and $\phi_2$. These clock signals must be accurately provided in circuitry external to the central processor unit.

Conventional clock design theory teaches that an oscillator might be used to generate pulses which are integrally related to the period of the desired clock pulses. These oscillator pulses would then be divided by a suitable divider. Logic circuitry would then detect the unique states along the counting cycle at which the desired clock signals would be generated.

I have discovered, however, that the number of logic gates required for such a system can be reduced. I have discovered that, although I detect states which occur twice, in each counting cycle, nonetheless I can use these states for generating the required clock signals and thereby eliminate a logic gate.

It is therefore an object of the invention to provide an improved computer clock.

Another object of the invention is to provide a computer clock having fewer logic gates than conventionally required and therefore being lower in cost and occupying less physical space.

Further objects and features of the invention will be apparent from the following specification and claims when considered in connection with the accompanying drawings illustrating the preferred embodiment of the invention.

SUMMARY OF INVENTION

The invention has an oscillator for generating five megahertz output pulses. The oscillator feeds its pulses to a count by 16 binary counter having the usual four outputs and having a reset to zero input. A first logic gate has its output connected to the reset input of the counter and a pair of inputs, one connected to the fours place output and the other to the eights place output of the counter for resetting the counter after every 12 oscillator pulses. The eights place output of the counter provides one of the clock signals. The output of a flip-flop provides the other clock signal. A second logic gate is provided having its output connected to the reset input of the flip-flop and having a pair of inputs connected to the ones place output and the fours place output of the counter for resetting the flip-flop to a zero state subsequent to the second oscillator output pulse after the counter is reset to zero. A third logic gate means has its output connected to a set input of the flip-flop and at least three inputs connected respectively to the twos place, the fours place and the eights place outputs of the counter for setting the flip-flop to a one state subsequent to the fifth oscillator pulse after the counter is reset.

Figure 1:
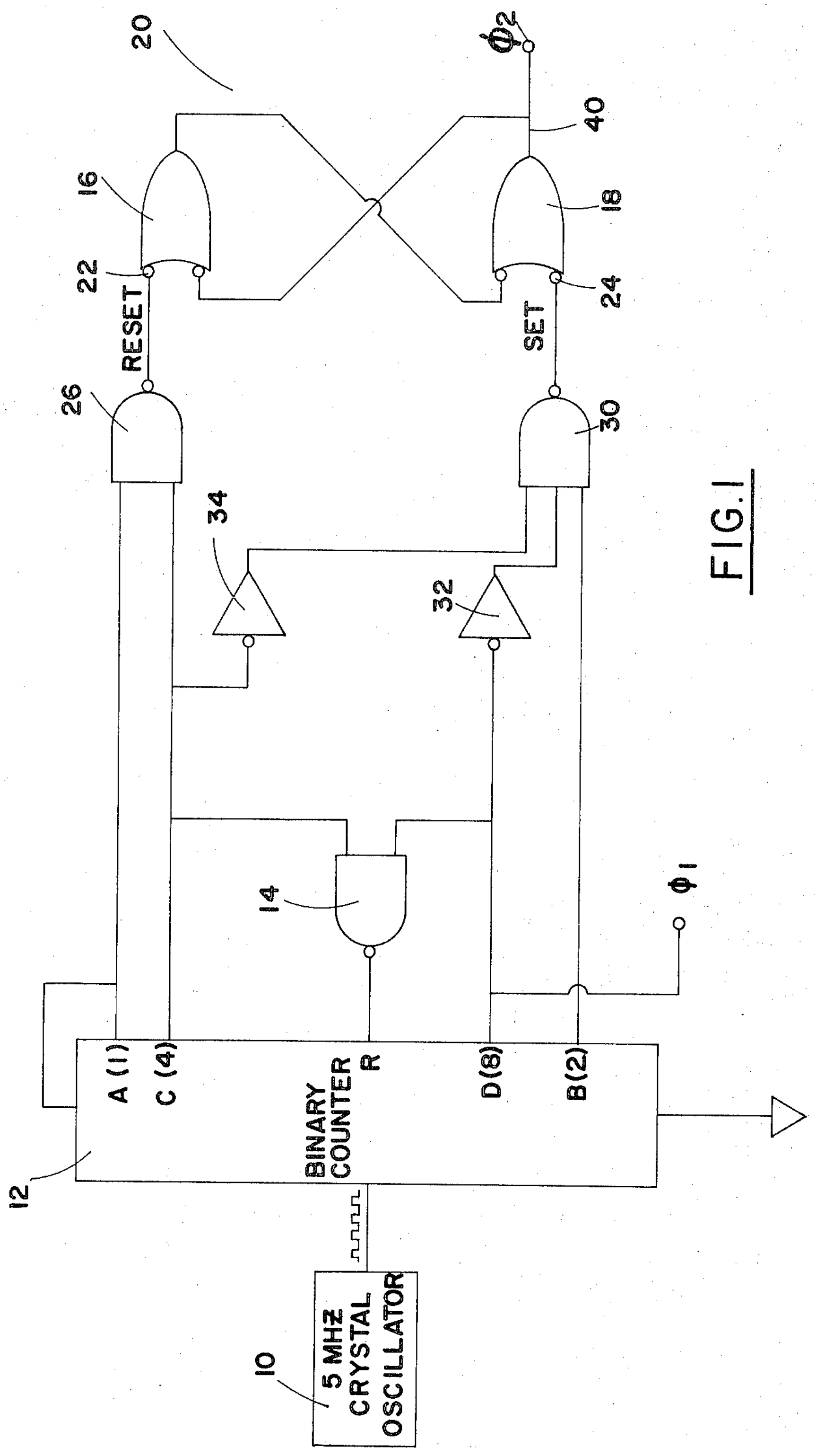
FIG. 1 is a schematic block logic diagram illustrating the preferred embodiment of the invention.

In describing the preferred embodiment of the invention illustrated in the drawings specific terminology will be resorted to for the sake of clarity. However, it is not intended to be limited to the specific term of so selected and it is to be so understood that each specific term includes all technical equivalents which operate in a similar manner to accomplish a similar purpose.

DETAILED DESCRIPTION

Figure 2:
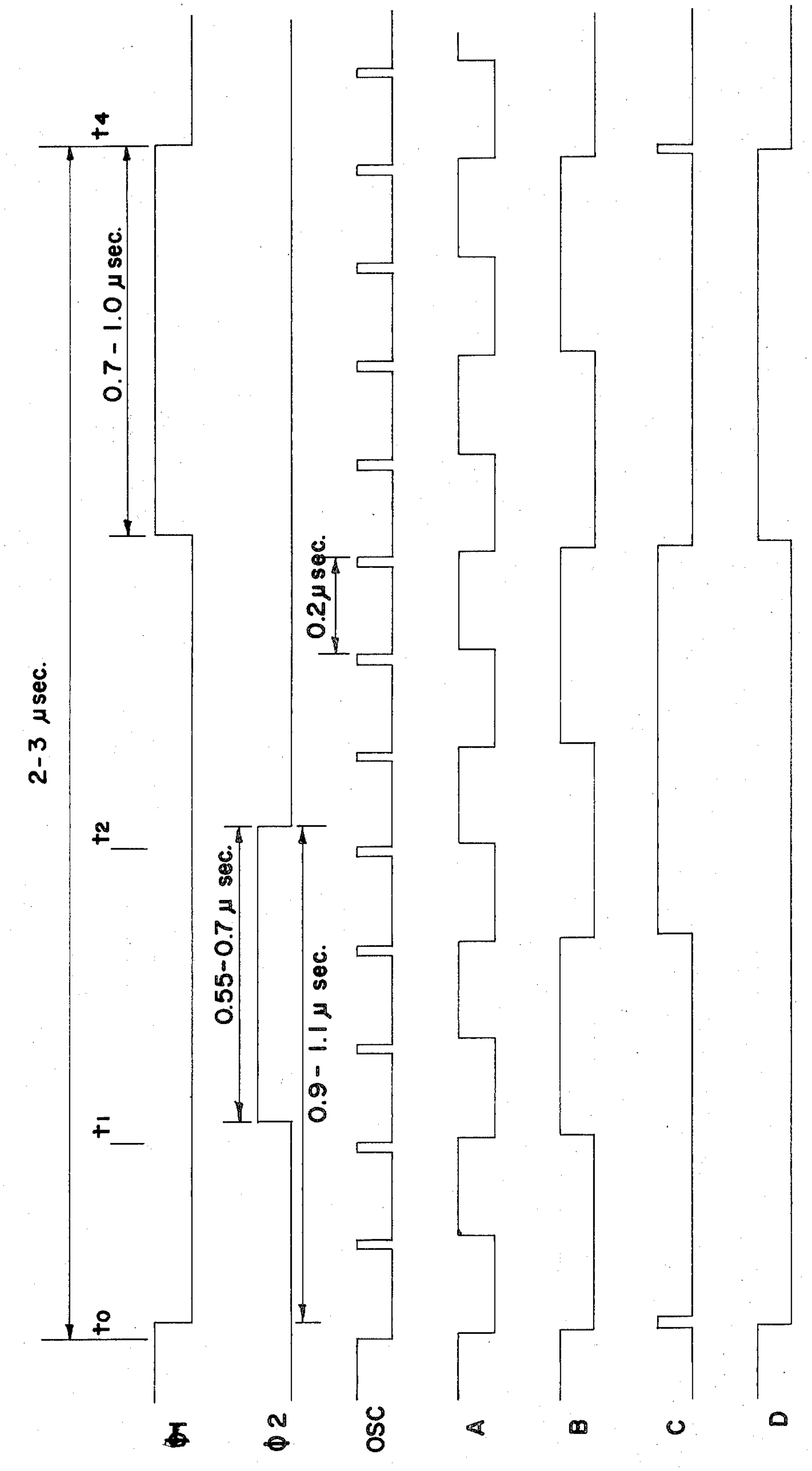
FIG. 2 is a series of oscillograms illustrating the operation of the preferred embodiment of the invention illustrated in FIG. 1.

Referring to the figures, the preferred embodiment of the invention utilizes a five megahertz crystal oscillator having a 0.01 percent accuracy. The output pulses of this oscillator, which is commercially available, are indicated in FIG. 2 at OSC. It should be noted that I have selected the oscillator frequency so that its period is 0.2 microseconds to that the total period for 12 oscillator pulses is 2.4 microseconds. This 2.4 microsecond period is well within the tolerance range for the period of the clock signals and in fact is quite close to the optimum 2.5 microseconds in the middle of the tolerance range.

These oscillator output pulses are applied to a binary counter 12 which has four binary outputs A, B, C and D. The output A represents the ones place, B represents the twos place, C represents the fours place, and D represents the eights place in the conventional binary number system. The output states at these outputs A, B, C and D are represented in FIG. 2 for at least 12 oscillator pulses.

The C and D outputs of the binary counter are applied to a nand gate 14 the output of which is connected to the reset input R of the binary counter 12. This results in the counter being reset to zero after every 12 pulses of the crystal oscillator 10. Thus, the overall period for one complete cycle of counter operation is 2.4 microseconds. Although a nand gate is used because the preferred binary counter is reset by application of a zero state at its reset input, it will be obvious to those skilled in the art that an "and" gate or other similar gates may be utilized to perform the same function depending upon the characteristic of the particular counter used. In fact other equivalent logic circuit changes may similarly be made elsewhere in the circuitry.

Another pair of nand gates 16 and 18 are connected in a conventional flip-flop configuration to provide a flip-flop indicated generally as 20 having a reset input 22 and a set input 24. Still another nand gate 26 has its output connected to the reset input 22 of the flip-flop 20 and its inputs connected to the outputs A and C of the binary counter 12. This nand gate 26 operates to reset the flip-flop 20 to a zero state subsequent to the fifth oscillator output pulse after the counter is reset to zero. Thus, referring to FIG. 2 the flip-flop is reset at time $t_1$.

Still another nand gate 30 has its output connected to the set input 24 the flip-flop 20. It has three inputs one of which is connected to the output B of the binary counter 12 and two of which are connected through inverters 32 and 34 to the outputs C and E of the binary counter 12. This nand gate 30 operates to set the flip-flop 20 to a one state subsequent to the second oscillator output pulse after the counter is reset. Thus, the flip-flop 20 is reset at time $t_2$.

The first clock signal $\phi 1$ is generated at the output D of the binary counter 12. The other clock signal $\phi 2$ is generated at the output 40 of the flip-flop 20.

Referring now to FIGS. 1 and 2 for a consideration of the operation of the preferred embodiment of the invention it can be seen that after the 12th oscillator pulse, at $t_4$, counter output C switches to a one state and output D is already in a one state. Therefore the nand gate 14 immediately resets the binary counter.

Immediately after the second oscillator pulse, at time $t_1$, the counter output B is in a 1 state while the outputs C and D are in a zero state. Consequently, immediately after time $t_1$ the flip-flop 20 will be set by the output of the nand gate 30.

This state is, of course, not a unique condition for these three counter outputs. The output condition B and not C and not D still exists after the third oscillator pulse. However, since this occurs during the $\phi 2$ pulse the flip-flop is again pulsed to a set state. Therefore the flip-flop 20 merely continues in the set state without any transition to its reset state. This is part of the reason that I am able to eliminate a logic gate from the circuit.

At time $t_2$ the A output of the binary counter 12 will switch to a 1 state while the C output of the binary counter 12 will also be at a 1 state. This will cause the nand gate 26 to reset the flip-flop 20 so that the output 40 of the flip-flop will switch to a zero state.

This condition of A and C in the 1 state is again repeated after the 7th oscillator pulse. However, similarly, this merely again actuates the reset input 22 of the flip-flop 20 which merely maintains the flip-flop 20 in its reset state and does not cause any transition. This, similarly, in part permits the reduction in logic gates which I have discovered.

It can therefore be seen that the output D of the binary counter 12 provides the $\phi 1$ clock signal. Similarly the output 40 of the flip-flop 20 provides $\phi 2$ clock signal and these two clock signals have the spacing and width within the tolerance limits required by the Intel central processor. In all cases the nominal figures for period, pulse width and pulse spacing us near the center of the permitted tolerances.

It is to be understood while the detailed drawings and specific examples given describe the preferred embodiment of the invention, they are for purposes of illustration only, that the apparatus of the invention is not limited to the precise details and conditions disclosed and that various changes may be made therein without departing from the spirit of the invention which is defined by the following claims:

What is claimed is:

1. A computer clock for generating a pair of clock signals and comprising:

a. an oscillator for generating output pulses;

b. a count by 16 binary counter having its input connected to the oscillator output and having four binary outputs representing the ones place, the twos place, the fours place and the eights place, said counter having an input for reset to 0, said eights place output providing one of said clock signals;

c. a first logic gate means having its inputs connected to said fours place output and said eights place output and its output connected to said reset input of said counter for resetting said counter after every 12 oscillator output pulses;

d. a flip-flop having set and reset inputs and having an output providing the other of said clock signals;

e. a second logic gate means having its output connected to the reset input of said flip-flop and having a pair of inputs connected to said ones place output and said fours place output of said counter for resetting said flip-flop to a 0 state subsequent to the fifth oscillator output pulse after the counter is reset to zero; and f. a third logic gate means having at least three inputs connected respectively to said twos place output, said fours place output and said eights place output and having its output connected to the set input of said flip-flop for setting the flip-flop to a one state subsequent to the second oscillator output pulse after the counter is reset.

2. A computer clock according to claim 1 wherein said first logic gate means comprises a first nand gate and wherein said counter is reset by a 0 state at its reset input.

3. A computer clock according to claim 1 wherein said flip-flop comprises a pair of flip-flop connected nand gates.

4. A computer clock according to claim 3 wherein said second logic gate means comprises a nand gate.

5. A computer clock according to claim 3 wherein said third logic gate comprises a fourth nand gate having its output connected to said set input of said flip-flop and a pair of inverters having their outputs connected to a different one of two of the inputs of said fourth nand gate; wherein the inputs of said inverters are connected one to the fours place output of said counter and the other to the eights place output of said counter and wherein a third input of said fourth nand gate is connected to the twos place output of said counter.

6. A computer clock according to claim 5 wherein said first logic gate means comprises a first nand gate and wherein said counter is reset by application of a 0 state at its reset input and wherein said second logic gate means comprises a nand gate.

7. A computer clock according to claim 6 wherein said oscillator provides 5 MHz output pulses.

* * * * *

UNITED STATES PATENT OFFICE
CERTIFICATE OF CORRECTION

Patent No. 3,821,653 Dated June 28, 1974

Inventor(s) Charles C. Fretwell

It is certified that error appears in the above-identified patent and that said Letters Patent are hereby corrected as shown below:

On the cover sheet insert above the Abstract

-- Attorney——Anthony D. Cennamo --.

Signed and sealed this 26th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U S GOVERNMENT PRINTING OFFICE 869-930